United States Patent [19]

Zinn

[11] 4,354,546

[45] Oct. 19, 1982

[54] HEADER PAIR AND DOUBLE TUBE MAT CONNECTION

[75] Inventor: Michael F. Zinn, Spring Glen, N.Y.

[73] Assignee: Bio-Energy Systems, Inc., Ellenville, N.Y.

[21] Appl. No.: 169,825

[22] Filed: Jul. 17, 1980

[51] Int. Cl.³ .............................................. F28F 7/00
[52] U.S. Cl. ........................................ 165/1; 165/46; 165/49; 165/176; 126/448; 29/157.4
[58] Field of Search ...................... 126/448; 29/157.4; 165/46, 49, 176, 1

[56] References Cited

U.S. PATENT DOCUMENTS

| | | |
|---|---|---|
| 4,112,921 | 9/1978 | MacCracken ..................... 126/448 |
| 4,269,172 | 5/1981 | Parker et al. ................... 126/448 X |
| 4,270,596 | 6/1981 | Zinn et al. .............................. 165/1 |

Primary Examiner—Albert W. Davis
Assistant Examiner—Margaret A. Focarino
Attorney, Agent, or Firm—Charles J. Brown

[57] ABSTRACT

A method and means for interconnecting (a) a pair of headers for circulating inflow and outflow fluids such as a heat exchange liquid with (b) first and second extended flexible tube mats formed of a plurality of tubes cojoined side-by-side with the end portions thereof separated from one another.

14 Claims, 4 Drawing Figures

HEADER PAIR AND DOUBLE TUBE MAT CONNECTION

BACKGROUND OF THE INVENTION

Tube mat heat exchanger systems for solar collectors, embedded radiant heating installations and other purposes are in widespread use. Such systems employ extended flexible tube mats having a number of tubes cojoined side-by-side with the tube end portions separated from one another and connected to a pair of manifold headers. A fluid such as a heat exchange liquid is passed through the inflow header to the first end of all the tubes in the mats and then out the opposite ends of the tubes into the outflow header. An optimum form of such tube mats is described in U.S. Pat. No. 4,176,654 and an improved technique for connecting the tube end portions to the headers is described in my copending U.S. patent application Ser. No. 17,724 filed Mar. 5, 1979.

In accordance with this prior art each tube mat is turned back alongside itself and the connection of the tube ends are made to the pair of headers so that the mats are disposed to one side of and extending laterally from the headers. If another array of mats is desired on the opposite side of the headers a second pair of headers and associated mats must be provided.

It is the principal object of the present invention to provide a double tube mat arrangement with a single header pair so that twice as great an area can be serviced with tube mats by one pair of headers. The double mats are associated with the one pair of headers in a manner such that one mat can be aligned with and laid over the other, so that for storage and shipment they can be rolled together into a unitary mat roll. When installed the double overlaid mats are unrolled and simply disposed on opposite sides of the single pair of headers, thus covering twice the area that a prior art header pair and roll would have covered.

SUMMARY OF THE INVENTION

The invention provides a method of interconnecting a pair of headers for circulating inflow and outflow fluid respectively, with first and second extended flexible tube mats each formed of a plurality of tubes cojoined side-by-side with the end portions thereof separated from one another. The method comprises disposing the first mat in a plane to that side of the inflow header opposite the outflow header so that all tubes thereof extend away from and then loop back toward the inflow header. The second mat is disposed in the same plane to that side of the outflow header opposite the inflow header so that all tubes thereof extend away from and then loop back toward the outflow header. The opposite separated end portions of each tube in the first mat are connected with the inflow and outflow headers respectively through first spaced holes in that side of each header on which the first mat is disposed. The opposite separated end portions of each tube in the second mat are connected with the inflow and outflow headers respectively through second spaced holes in that side of each header on which the second mat is disposed.

In accordance with the invention a header pair and double tube mat assembly is provided comprising a pair of tubular headers for circulating inflow and outflow fluids respectively. First and second extended flexible tube mats are included, each formed of a plurality of tubes cojoined side-by-side with the end portions thereof separated from one another. One end portion of each mat is disposed alongside the other end portion. The opposite separated end portion of each tube in the first mat are connected with the inflow and outflow headers respectively through uniformly spaced first holes in one side of each header. The opposite separated end portions of each tube in the second mat are connected with the inflow and outflow headers respectively through uniformly spaced second holes in that side of each header opposite the first spaced holes. By this construction the mats can be aligned and rolled up together and easily unrolled on opposite sides of the headers.

DESCRIPTION OF PREFERRED EMBODIMENT

Figure 1:
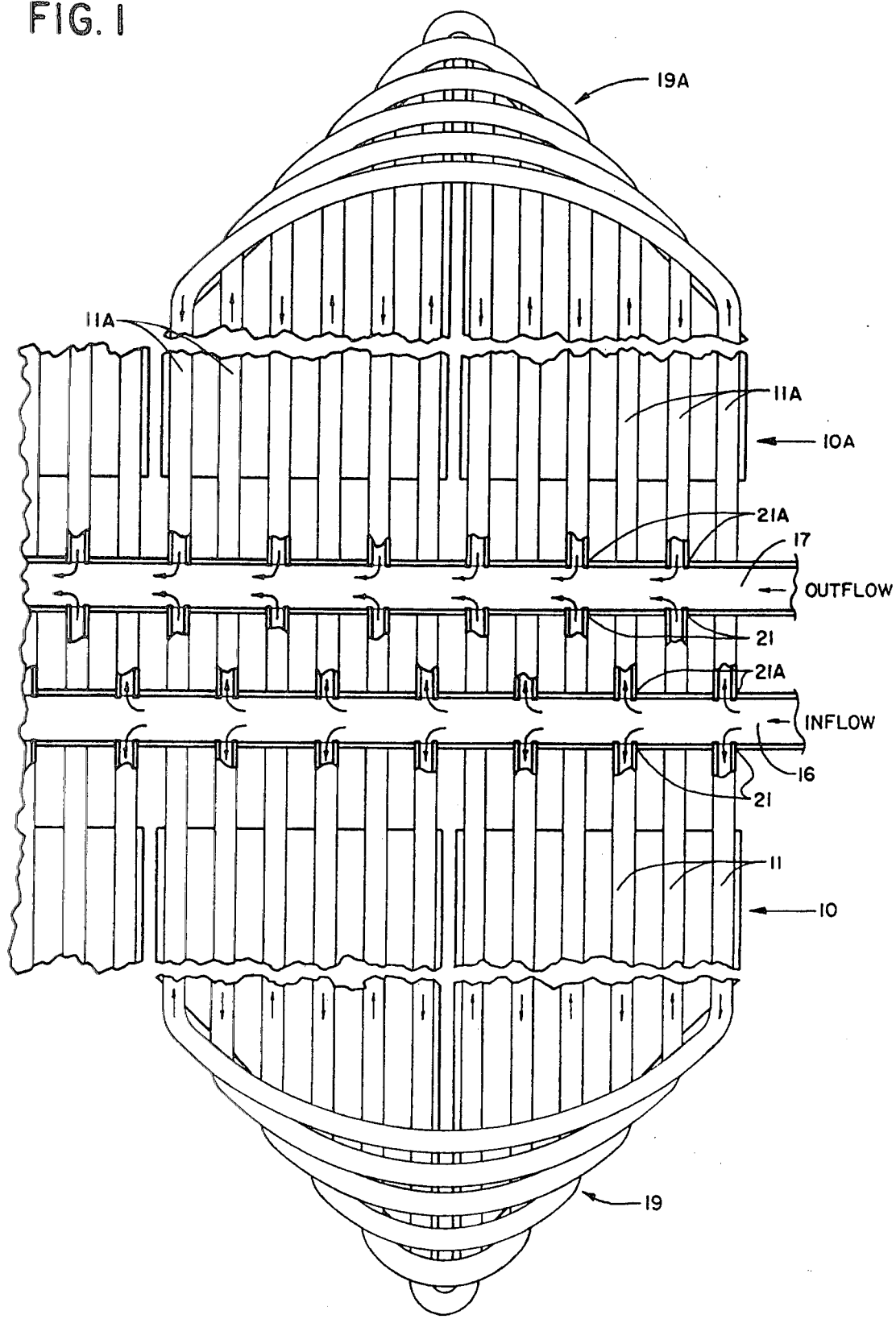
FIG. 1 is a partly diagrammatic plan view showing the header pair and double tube mat system of the invention in place in an installation.
Figure 2:
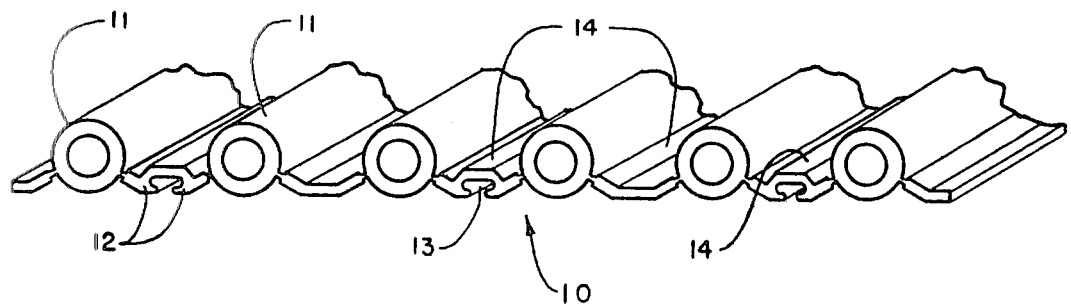
FIG. 2 is a fragmentary perspective view of one end of a tube mat for use in the invention.

Referring first to FIGS. 1 and 2, a typical extruded tube mat 10 is shown of EPDM rubber or other elastomeric material. The preferred configuration illustrated is described in detail in U.S. Pat. No. 4,176,654 and includes six tubes 11 each having a nominal outside diameter of approximately 0.338 inch and a nominal inside diameter of approximately 0.203 inch so that its wall thickness is approximately 0.067 inch. The underside of the tube mat 10 may have a plurality of deflectable projections 12 defining corresponding recesses 13 for receiving mastic or other bonding material when the tube mat is installed in place. Each pair of adjacent tubes is connected by a web 14 from which the tubes may be severed lengthwise along tear lines to permit the tubes to be separated.

The assembly also includes a pair of parallel closely spaced rigid tubular headers 16 and 17. The header 16 is intended to carry inflow heat exchange liquid to the tube mats 10 and the liquid is returned as outflow through the header 17. The headers may be of plastic material and have a typical outside diameter of one and one-half inches and a type M wall thickness.

The method of installing a given tube mat 10 in accordance with the aforementioned copending application is to remove the web 14 from between the tubes 11 in a central section of the mat and align the mat half-sections parallel and side-by-side substantially coplanar with one another. In FIG. 1 the free portions of the tubes 10 are shown schematically by dot-dash lines 19 in the central section of the mat and they cross over one another so that each tube remains uninterrupted from one end to the other. The end portions of the tubes 10 are separated from their webs 14 with alternating tubes cut relatively long and relatively short for appropriate connection to the headers 16 and 17 described below.

Figure 3:
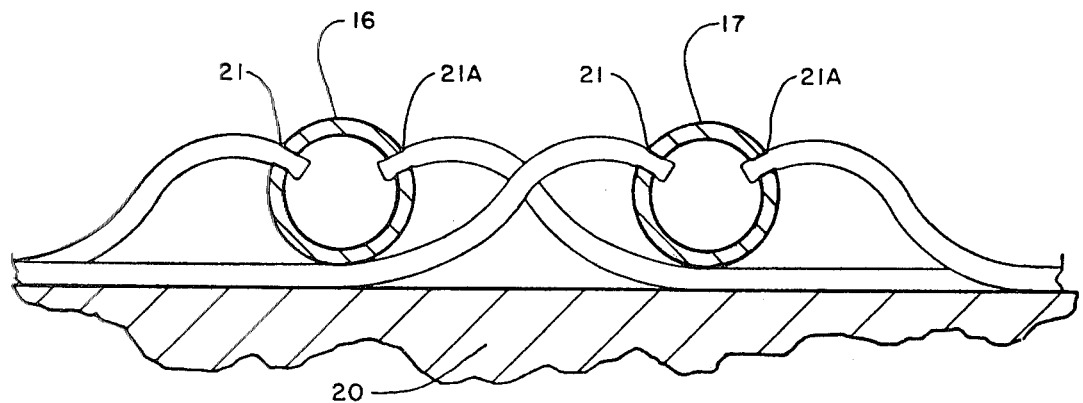
FIG. 3 is an enlarged fragmentary section of the double headers and tube end portion connections.

The method and assembly for interconnecting the pair of headers with a plurality of the tube mats are described in reference to FIGS. 1 through 3. The tube mat 10 shown in FIG. 1 shall be referred to as the first tube mat and it is associated with a similar second tube mat 10A. The first tube mat 10 is disposed in a plane to that side of the inflow header 16 opposite the outflow header 17 so that all of the tubes 11 extend perpendicularly away from and then loop back toward the inflow header 16. The half-sections of the mat 10 are substantially perpendicular to the pair of headers and all of the tubes thereof are parallel to one another except at the free intermediate cross-over portions 19. It should be noted that there are a plurality of such first mats 10 arranged in succession alongside one another, a portion of the next mat 10 being shown on the left side of FIG. 1.

The second mat 10A is similarly disposed in the same plane to that side of the outflow header 17 opposite the inflow header 16 so that all of its tubes 11A extend substantially perpendicular away from and then loop back parallel to themselves toward the outflow header 17. Again, there are a plurality of such second mats 11A and the next one on the left is shown in FIG. 1. Each first mat 10 is disposed directly opposite one of the second mats 10A in alignment therewith and both are supported on an appropriate undersurface 20 as shown in FIG. 3.

Opposite separated end portions of each tube 11 in the first mat 10 are connected with the inflow and outflow headers 16 and 17 respectively through aligned first holes 21 spaced apart equally twice the spacing between adjacent tubes in the mats. There are three such first holes 21 in the inflow header 16 for one half-section of the mat 10 itself, and there are another three such holes 21 in the header 16 for the other half-section of the tube mat 10. As is apparent from FIG. 1, there is a similar arrangement of six first holes 21A in the outflow header 17 for receiving the two half-sections of the other ends of the tubes 11. The first spaced holes 21 are in lines in the respective headers all facing the first mat 10.

The opposite separated end portions of each tube 11A in the second mat 10A are connected with the inflow and outflow headers 16 and 17 respectively through aligned second holes 21A spaced apart equally twice the spacing between adjacent tubes in the mats. The second holes 21A are located in that side of the headers 16 and 17 on which the second mat 10A is disposed. For easy insertion of the tubes, each line of second spaced holes 21A is approximately 120° around the respective headers from the line of first holes 21. Each of the first holes 21 has an axis which is substantially coplanar with the axis of one of the second holes 21A.

As shown in FIG. 3, the headers 16 and 17 are disposed immediately above the plane of the mats. End portions of the tubes 11 in the first mat 10 are directed under the inflow header 16 to the first holes 21 in the outflow header 17. The end portions of the tubes 11A in the second mat 10A are directed under the outflow header 17 to the second holes 21A in the inflow header 16.

As can be seen from the arrows in FIG. 1, inflow liquid is carried from right to left in the header 16. This liquid proceeds through the holes 21 and 21A into the tubes 11 and 11A of both mats 10 and 10A and is carried from one end to the other of each such tube through the loop portions 19 and 19A to emerge at the outflow header 17. One pair of headers thereby serves two mats, each covering a substantial extended area to opposite sides of the pair of headers.

Figure 4:
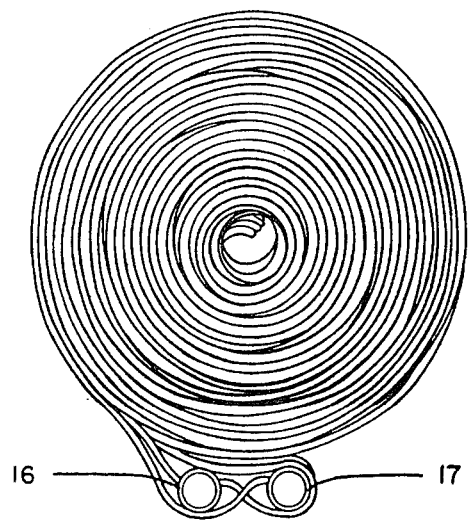
FIG. 4 is an end view of the header pair and double tube mat assembly rolled up for shipment or storage.

For storage and shipment prior to installation the first mat 10 is aligned with and laid over the second mat 10A and the two mats are rolled up together as shown in FIG. 4. The assembled roll of a plurality of double mats and their associated pair of headers is far more compact and easily handled than are two rolls of the single mats of the prior art.

In a typical installation each of the headers may have two rows of thirty holes, with the headers in the middle instead of at one end of the array of mats. This configuration allows longer tube mat runs with reduced pressure drips. More versatility is possible in fitting a difficult or limited space with appropriate tube mats.

The foregoing description of a preferred embodiment is illustrative only and the scope of the present invention is to be taken from the following claims.

I claim:

1. A method of interconnecting a pair of headers for circulating inflow and outflow fluid respectively with first and second extended flexible tube mats each formed of a plurality of tubes cojoined side-by-side with the end portions thereof separated from one another, which comprises
    (a) disposing the first mat in a plane to that side of the inflow header opposite the outflow header so that all tubes thereof extend away from and then loop back toward said inflow header,
    (b) disposing the second mat in the same plane to that side of the outflow header opposite the inflow header so that all tubes thereof extend away from and then loop back toward said outflow header,
    (c) connecting the opposite separated end portions of each tube in the first mat with the inflow and outflow headers respectively through first spaced holes in that side of each header on which the first mat is disposed, and
    (d) connecting the opposite separated end portions of each tube in the second mat with the inflow and outflow headers respectively through second spaced holes in that side of each header on which the second mat is disposed.

2. A method according to claim 1 wherein the first mat is disposed directly opposite the second mat in alignment therewith.

3. A method according to claim 1 wherein the headers are tubular, the first spaced holes being in first lines in the respective headers facing the first mat and the second spaced holes being in second lines more than 90° but less than 180° hole having an axis substantially coplanar with the axis of one of the second holes.

4. A method according to claim 1 wherein the end portions of the tubes in the first mat are directed under the inflow header to the first holes in the outflow header, and the end portions of the tubes in the second mat are directed under the outflow header to the second holes in the inflow header.

5. A method of interconnecting a pair of parallel closely spaced rigid tubular headers for circulating inflow and outflow head exchange liquid respectively with a plurality of first and second extended elastomeric tube mats each formed with a plurality of parallel tubes cojoined side-by-side with the end portions thereof separated from one another, which comprises
    (a) disposing each first mat in a plane to that side of the inflow header opposite the outflow header so that all tubes thereof extend substantially perpendicularly away from and then loop back parallel to themselves toward said inflow header, all of said first mats and the out and back portions thereof being arranged in succession alongside one another;

(b) disposing each second mat in the same plane to that side of the outflow header opposite the inflow header so that all tubes thereof extend substantially perpendicularly away from and then loop back parallel to themselves toward said outflow header, all of said second mats and the out and back portions thereof being arranged in succession alongside one another;

(c) connecting the opposite separated end portions of each tube in the first mats with the inflow and outflow headers respectively through aligned first holes spaced apart equally twice the spacing between adjacent tubes in the mats, the first holes being in that side of the headers on which the first mats are disposed; and (d) connecting the opposite separated end portions of each tube in the second mats with the inflow and outflow headers respectively through aligned second holes spaced apart equally twice the spacing between adjacent tubes in the mats, the second holes being in that side of the headers on which the second mats are disposed.

6. A method according to claim 5 wherein each first mat is disposed directly opposite one of the second mats in alignment therewith.

7. A method according to claim 5 the first spaced holes are in lines in the respective headers facing the first mat and the second spaced holes are in second lines approximately 120° around the respective headers from the first lines, each first hole having an axis substantially coplanar with the axis of one of the second holes.

8. A method according to claim 5 wherein the headers are disposed immediately above the plaine of the mats, end portions of the tubes in the first mats being directed under the inflow header to the first holes in the outflow header, and end portions of the tubes in the second mats being directed under the outflow header to the second holes in the inflow header.

9. A header pair and double tube mat assembly comprising (a) a pair of parallel tubular headers for circulating inflow and outflow fluids respectively, (b) first and second extended flexible tube mats each formed of a plurality of tubes cojoined side-by-side with the end portions thereof separated from one another, (c) one end portion of each mat being disposed alongside the other end portion, (d) the opposite separated end portions of each tube in the first mat being connected with the inflow and outflow headers respectively through uniformly spaced first holes in one side of each header, (e) the opposite separated end portions of each tube in the second mat being connected with the inflow and outflow header respectively through uniformly spaced second holes in that side of each header opposite the first spaced holes, (f) whereby the mats can be aligned and rolled up together and also unrolled to opposite sides of the headers.

10. An assembly according to claim 9 wherein the first spaced holes are in first lines in the respective headers and the second spaced holes are in lines more than 90° but less than 180° around the respective headers from the first lines, each first hole having an axis substantially coplanar with the axis of one of the second holes.

11. An assembly according to claim 10 wherein the lines of holes are spaced approximately 120° apart around the respective headers.

12. An assembly according to claim 10 wherein adjacent holes in each line are spaced apart twice the distance between adjacent tubes in the mats.

13. An assembly according to claim 9 wherein there are a plurality of first tube mats arranged in succession side-by-side and a plurality of second tube mats arranged in succession side-by-side.

14. An assembly according to claim 9 wherein the tube mats are of extruded elastomeric material and the headers are rigid.

* * * * *